US00RE41476E

(19) United States
(12) Reissued Patent
Muehleck et al.

(10) Patent Number: US RE41,476 E
(45) Date of Reissued Patent: Aug. 3, 2010

(54) MULTI-TIERED STRUCTURE FOR STORING AND DISPLAYING PRODUCT AND PROCESS VARIANTS

(75) Inventors: Peter Muehleck, Sandhausen (DE); Adam Polly, Stutensee-Blankenloch (DE)

(73) Assignee: SAP Aktiengesellschaft, Walldorf (DE)

(21) Appl. No.: 10/421,080

(22) Filed: Apr. 23, 2003

Related U.S. Patent Documents

Reissue of:
(64) Patent No.: 6,223,094
Issued: Apr. 24, 2001
Appl. No.: 09/138,147
Filed: Aug. 21, 1998

(51) Int. Cl.
*G06F 19/00* (2006.01)

(52) U.S. Cl. ..... 700/107; 700/95; 700/108; 700/110; 700/117; 709/201; 709/203

(58) Field of Classification Search ..... 700/107, 700/108, 110, 117, 95, 100; 709/203, 201; 705/1, 4, 29
See application file for complete search history.

(56) References Cited

U.S. PATENT DOCUMENTS 4,835,709 A * 5/1989 Tsai ..... 706/45
4,847,761 A 7/1989 Ferriter et al.
4,862,376 A * 8/1989 Ferriter et al. ..... 700/107

(Continued)

FOREIGN PATENT DOCUMENTS

DE 4400984 C2 1/1984
DE 3911465 C2 4/1989
DE 196147789 C1 4/1996

(Continued)

OTHER PUBLICATIONS

Support of Multiple Manufacturing Product Definition; IBM Technical Disclosure Bulletin, Sep. 1, 1992; vol. 35, Issue 4B, p. 316–319.*

(Continued)

*Primary Examiner*—Frantz B Jean
(74) *Attorney, Agent, or Firm*—Fish & Richardson P.C.

(57) ABSTRACT

A computer based system is provided that is capable of displaying component and process structures for configurable product classes stored in a data structure. Product classes in the data structure are represented by product nodes. Components, which are abstractions of concrete items used in the product, are represented by component nodes. Component nodes are mapped to each product class with which the component is associated, and are associated with one or more component variants, which are concrete items used in the manufacture of a particular product variant. Process nodes, which are abstractions of actual steps required to produce a product variant, known as process variants, are represented by process nodes. The computer based system can display several alternative views of the data structure. For example, upon receiving a selection for a particular product class, the computer based system converts and can graphically display all component and process nodes associated with that product class. Alternatively, the system can receive input of a product variant and display all component variants used in its production, which is its bill of materials.

26 Claims, 8 Drawing Sheets

U.S. PATENT DOCUMENTS

| | | | | | |
|---|---|---|---|---|---|
| 4,958,292 | A | | 9/1990 | Kaneko et al. | |
| 5,109,337 | A | * | 4/1992 | Ferriter et al. | 705/29 |
| 5,119,307 | A | | 6/1992 | Blaha et al. | 364/468 |
| 5,201,046 | A | * | 4/1993 | Goldberg et al. | 707/100 |
| 5,216,613 | A | * | 6/1993 | Head, III | 369/275.2 |
| 5,307,261 | A | | 4/1994 | Maki et al. | 364/401 |
| 5,311,424 | A | | 5/1994 | Mukherjee et al. | 364/401 |
| 5,436,842 | A | | 7/1995 | Hara | |
| 5,467,285 | A | | 11/1995 | Flinn et al. | |
| 5,515,269 | A | | 5/1996 | Willis et al. | 364/401 |
| 5,523,942 | A | * | 6/1996 | Tyler et al. | 705/4 |
| 5,675,784 | A | * | 10/1997 | Maxwell et al. | 707/100 |
| 5,708,798 | A | * | 1/1998 | Lynch et al. | |
| 5,740,425 | A | * | 4/1998 | Povilus | 707/100 |
| 5,764,519 | A | | 6/1998 | Tsukishima et al. | |
| 5,777,877 | A | | 7/1998 | Beppu et al. | |
| 5,815,395 | A | * | 9/1998 | Hart et al. | 700/110 |
| 5,825,651 | A | * | 10/1998 | Gupta et al. | 700/103 |
| 5,980,096 | A | * | 11/1999 | Thalhammer-Reyero | 707/100 |
| 6,040,834 | A | * | 3/2000 | Jain et al. | 715/853 |
| 6,112,181 | A | * | 8/2000 | Shear et al. | 705/1 |
| 6,141,598 | A | | 10/2000 | Nam | |

FOREIGN PATENT DOCUMENTS

| | | | | | |
|---|---|---|---|---|---|
| DE | 19714627 | A1 | | 4/1997 | |
| DE | 19815619 | A1 | | 4/1998 | |
| EP | 0457706 | A2 | | 4/1991 | |
| EP | 0488246 | A2 | | 11/1991 | |
| EP | 0 481 907 | A2 | | 4/1992 | |
| EP | 0 481 907 | A3 | | 4/1992 | |
| EP | 0 639 815 | A3 | | 2/1995 | |
| EP | 0 639 815 | A2 | | 2/1995 | |
| EP | 639815 | A2 | | 2/1995 | |
| EP | 760506 | A2 | | 3/1997 | |
| EP | 838773 | A1 | | 4/1998 | |
| EP | 0 838 773 | B1 | | 4/1998 | |
| EP | 0 838 773 | A1 | | 4/1998 | |
| EP | 0 838 773 | | * | 4/1998 | |
| EP | 992868 | A2 | | 12/2000 | |
| GB | 2289963 | | | 12/1995 | |
| GB | 2325066 | A | | 11/1998 | |
| JP | 401091203 | | * | 4/1989 | 15/2 |
| WO | WO 94/23372 | | | 10/1994 | |
| WO | 95/01610 | | | 1/1995 | |
| WO | WO 96/28784 | | | 9/1996 | |
| WO | WO 98/08177 | | | 2/1998 | |
| WO | WO 98/10360 | | | 3/1998 | |
| WO | WO 98/33104 | | | 7/1998 | |

OTHER PUBLICATIONS

Michael R. Blaha et al., "Relational Database Design Using an Object–Oriented Methodology", *Communications of the ACM*, vol. 31, No. 4, pp. 414–427 (Apr. 1988).

H.M.H. Hegge et al., "Generic bill–of–material: a new product model", *International Journal of Production Economics*, vol. 23, pp. 117–128 (1991).

William M. Kerber, "Structuring and Managing the Bill of Material under Changing Company Conditions", *Proceedings of the 33rd International Conference Proceedings of the American Production and Inventory Control Society*, pp. 421–424 (Oct., 1991).

A.E. Robinson, "Current ideas in knowledge–base management systems", *Information and Software Technology*, vol. 32, No. 4, pp. 266–273 (May, 1990).

Hartmut Wedekind et al., "Stücklistenorganisation bei einer groβen Variantenanzahl*", *Angewandte Informatik*, Sep. 1981 pp. 377–383.

Australian Patent application No. 60792/99, Australian Patent Office Action dated Jul. 19, 2002.

EP Application No. 02008116.2, European Patent Office Action dated Jun. 28. 2002.

Japanese Patent application No. 2000–566767, Japanese Patent Office Action dated Feb. 13, 2004.

Japanese Patent application No. 2000–566767, Japanese Patent Office Action dated May 6, 2003.

PCT Application No. PCT/EP99/06087, PCT International Preliminary Examination Report dated Nov. 27, 2000.

PCT Application No. PCT/EP99/06087, PCT International Search Report dated Jan. 26, 2000.

IBM Technical Disclosure Bulletin, vol. 33, issue 6B, p. #147–150, title: TFR Expert system Shell, Nov. 1990.*

Gu, P. et al: "Product modeling using step", Computer Aided Design, GB, Elsevier Publishers, BV., Barking Bd. 27, Nr. 3, 1995, Seite 163–179.*

Erens, F. et al: "Product Modelling Using Multiple Levels of Abstraction Instances as Types" Computers in Industry, NL., Elsevier Science Publishers, Amsterdam. Bd. 24, Nr. 1, 1994, Seite 17–28.*

STEP Application Protocol ISO 10303–214 Updated CDII Document (Sep. 30, 1997)—Core Data for Automotive Mechanical Design Processes, 1997, Technical University Darmstadt, Germany (Relevant sections enclosed).*

Peters, H.D., "TI–Syncro—The New BoM Approach of Volkswagen, " presentation at CIMData PDM Europe Conference, Nov. 28–30, 1997, in Noordwijk, Netherlands.*

* cited by examiner

MULTI-TIERED STRUCTURE FOR STORING AND DISPLAYING PRODUCT AND PROCESS VARIANTS

Matter enclosed in heavy brackets [ ] appears in the original patent but forms no part of this reissue specification; matter printed in italics indicates the additions made by reissue.

FIELD OF THE INVENTION

This invention relates to a computer based system and method for displaying component and process structures for configurable product classes stored in a data structure.

BACKGROUND

Many industries offer highly variant products to their customers, a prime example being the automotive industry. Automobile manufacturers typically offer several models to their customers, who can often choose among numerous options for a selected model. As a result, it becomes necessary for a manufacturer to keep track of hundreds of products and their corresponding component structures and related production processes. Manufacturing companies offering a high variance of products and wishing to maintain reasonable costs depend on an efficient information system for products and their associated components and processes.

Existing database systems for product structures tend to be redundant. For example, a database may contain component lists for hundreds of different products, the result being that the same component would be listed separately for each product with which it is associated. While such a system may be useful for manufacturing products, it is impractical from a design perspective. A designer cannot readily view, for example, the extent of specific products or product classes affected by a change to a particular component. Nor could he easily obtain a clear picture of which components are common to certain product classes, and which are specific only to a particular product within a class. Nor could he see the routing a particular product and its components through its production processes. These are important features from a cost perspective, since they enable a designer to make decisions as to whether or not to include, or to change, particular components based on the number of products or product classes that are affected. An accurate view of the components and processes associated with product classes is vital for efficient design and manufacturing.

A system for depicting products and their associated components was described at a presentation given by Volkswagen at the CIMData European Conference in 1997. The system includes a data structure with a tree-like representation of the various components and subcomponents for a single model of a car. Each component is represented by a node and is associated with specific variants, such as "leather" and "vinyl" for the component "seat". The structure is limited to a single product class, however. Since there is no product hierarchy, components are mapped to at most one product class. Therefore, the system does not enable alternative viewing of components associated with broad product classes and components associated with particular products, as would be desirable both from design and production perspectives, respectively.

Another example of a system for depicting a similar structure is the STEP Protocol ISO 10303-214. Although this system can depict the processes as well as components for a particular product class, it does not distinguish between the actual production steps required for a general process, and those steps required for specific processes. Accordingly, the system cannot accurately maintain or display the actual production steps required for production of a particular product variant. Furthermore, STEP does not enable viewing of components and processes associated with different product classes, nor does it allow for more than one possible decomposition of a particular component.

It would be desirable to have a computer based system containing a hierarchy of product classes, whereby individual product components are mapped to all product classes with which the component is related, and all components of a particular product class can be displayed in a graphical format. Specific component variants, representing the concrete item used for a particular product variant, would also be associated with each component. Similarly, the processes required to assemble components would be mapped to those components, and specific variants of those processes, or the actual production steps associated with particular component variants, associated with each process. The computer based system would enable viewing of all of the components and processes associated with any product class within the product class hierarchy on a display.

SUMMARY OF THE INVENTION

It is accordingly an object of the invention to provide a computer based system having a data structure stored in memory, whereby products in the data structure are grouped hierarchically by classes and subclasses.

It is a further object of the invention to provide within the data structure component nodes and process nodes representing individual components and processes used within each of those product classes and subclasses in the data structure.

It is a further object of the invention to map those component and process nodes to each of their associated product classes and subclasses within the data structure.

It is a further object of the invention to provide within the data structure component variants for individual component nodes, representing the range of concrete items used for that component and their quantities.

It is a further object of the invention to provide within the data structure process variants for each process node, representing the range of production steps used for that process.

It is a further object of the invention to provide within the data structure a selection condition that specifies the particular component variant and process variant to be used for a particular product variant according to the specific product characteristics of the product variant.

It is a further object of the invention to support more than one possible decomposition for a particular component within the data structure.

It is a further object of the invention to enable graphical viewing on a visual display of all components associated with a product class specified through a user interface.

It is a further object of the invention to enable graphical viewing on a visual display all processes associated with components within a product class specified through a user interface.

It is a further object of the invention to enable graphical viewing on a visual display all components for a specific product variant, which is the bill of materials for that product variant.

In accordance with these and other objects, a computer based system is provided with a memory containing a product variant data structure with products grouped hierarchically by classes. Components are mapped to all individual product classes with which they are associated. Processes are mapped to all individual components with which they are associated. Component variants and process variants, which are the actual concrete items and production steps used to make a particular product, are associated with each component and process, respectively. Product classes and subclasses can be displayed graphically on a visual display in a tree-like format with their associated components, component variants, processes and/or process variants.

Components, which are abstractions of concrete items used in the product, are represented by component nodes. Each component node is associated with a certain product class and with one or more component variants, representing the range of concrete items used in the product for that component. For example, the component "wheel" includes components "tire" and "rim". Specific component variants for "rim" may include aluminum rim, steel rim type A, and steel rim type B. Component variants have a selection condition which selects the appropriate component variants for a specific product, or "product variant", within the related product class. The set of all selected component variants forms the bill of materials for that particular product variant.

Processes, which are abstractions of actual steps used in the production process, are represented by process nodes. Each process node is generally associated with at least one component and with one or more process variants, which are the actual production steps that are employed for particular variants of the affected component or components. For example, the generalized process "mount door" may include a first process variant representing the actual production steps necessary to mount a regular door, and a second process variant representing the different production steps necessary to mount a door equipped, for example, with an automatic lift mechanism.

DETAILED DESCRIPTION

Figure 1:
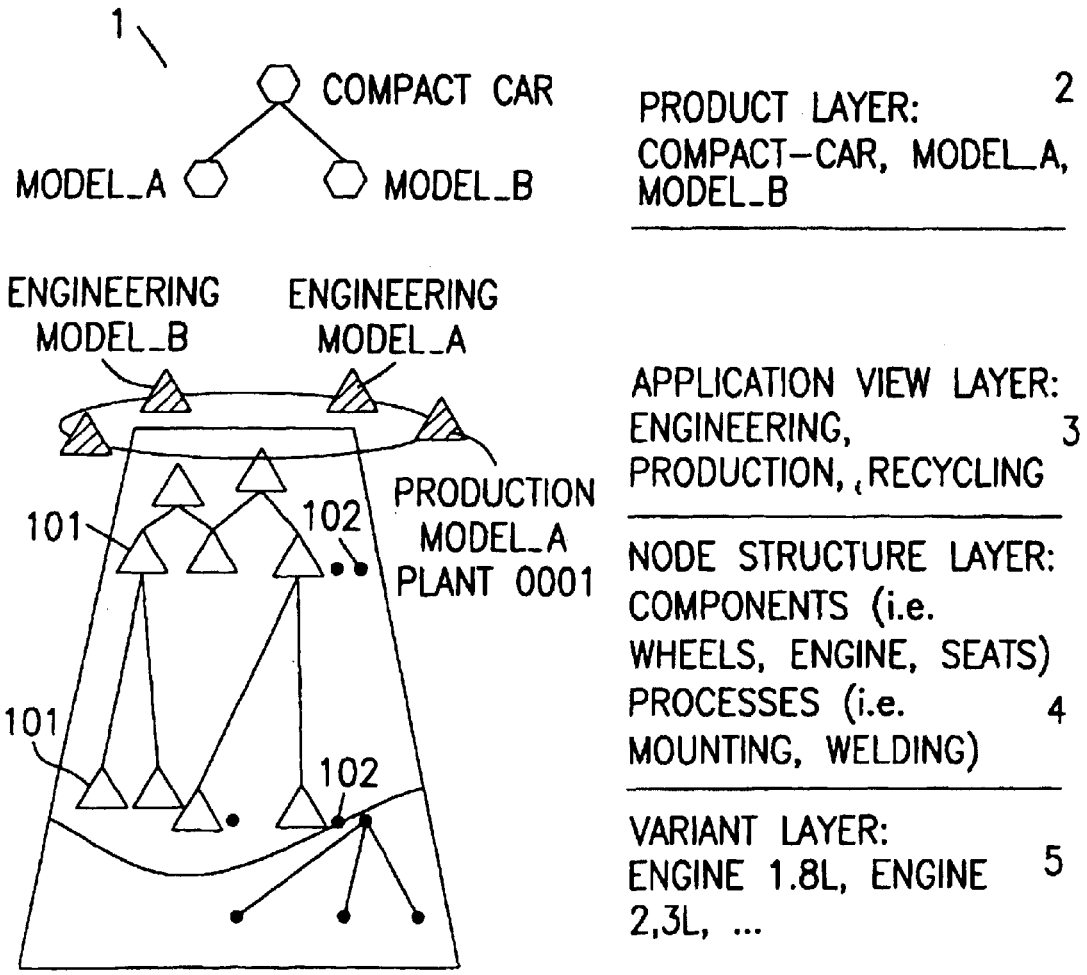
FIG. 1 shows the four-layer approach of the product variant data structure of the computer based system.

The product variant data structure 1 of the computer based system is divided into four layers, as shown in FIG. 1: the Product Layer 2, the Application View Layer 3, the Node Structure Layer 4, and the Variant Layer 5. The top layer is the Product Layer 2, which consists of a description of products and product families, each with particular characteristics. This layer may be hierarchically structured to show the relationship between product families. For example, the product class "Compact Car" may consist of sub-classes "Model A" and "Model B", as shown.

Figure 2:
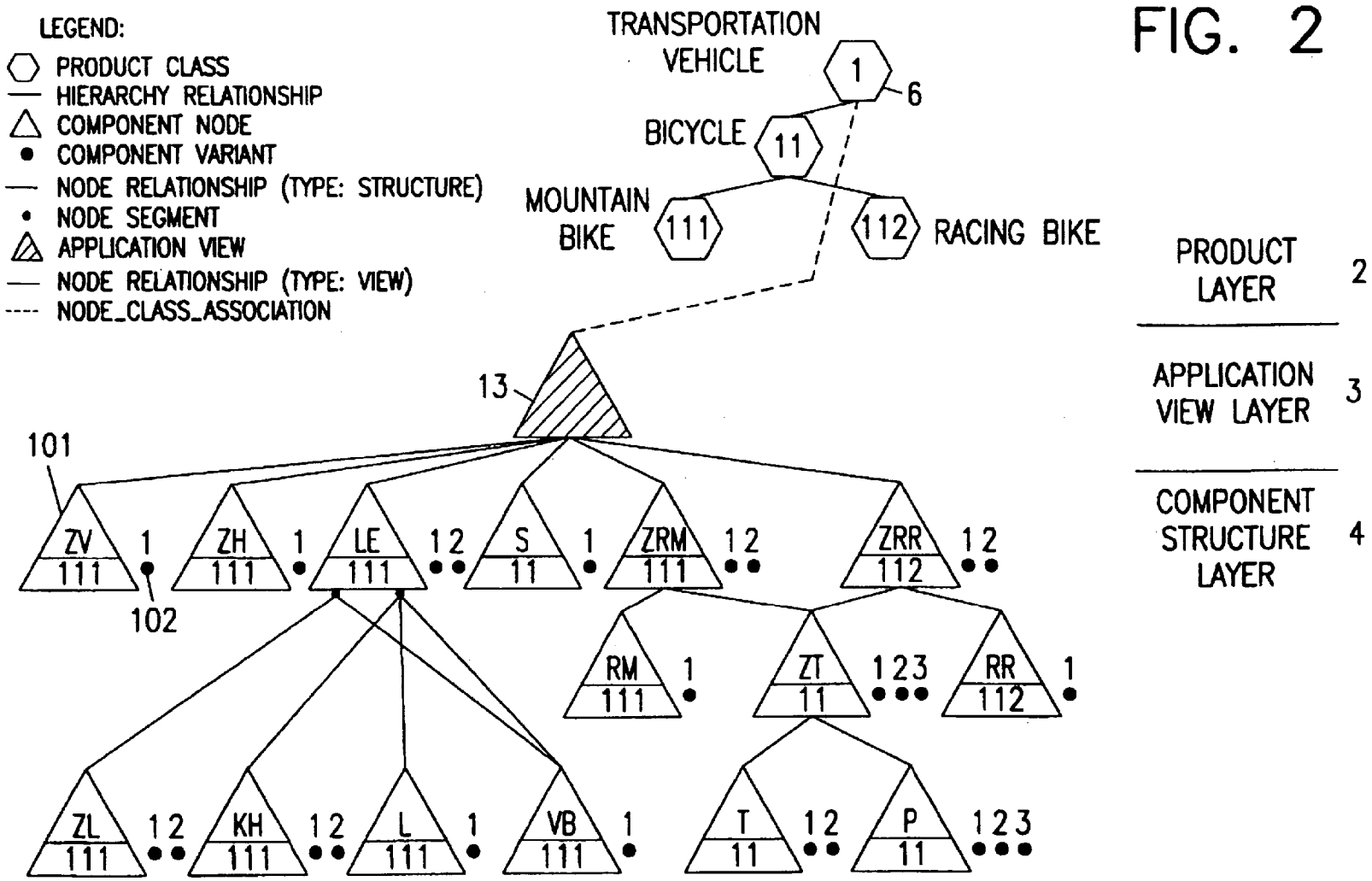
FIG. 2 shows an example of the application view "Engineering"-on the product family "transportation vehicle" in the data structure.
Figure 3:
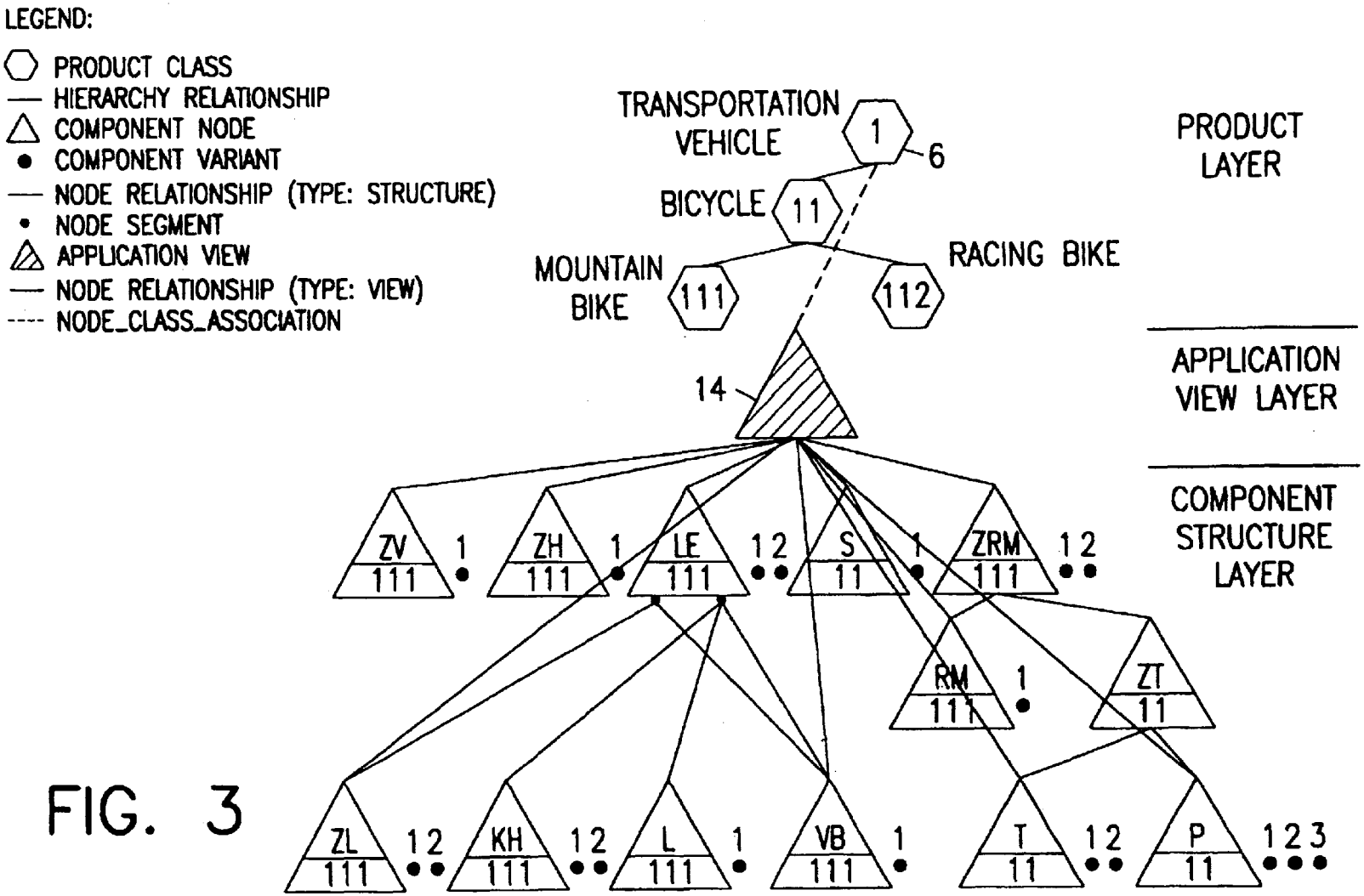
FIG. 3 shows an example for the application view "Materials Requirement Planning" on the product class "mountain bike" in the data structure.
Figure 4:
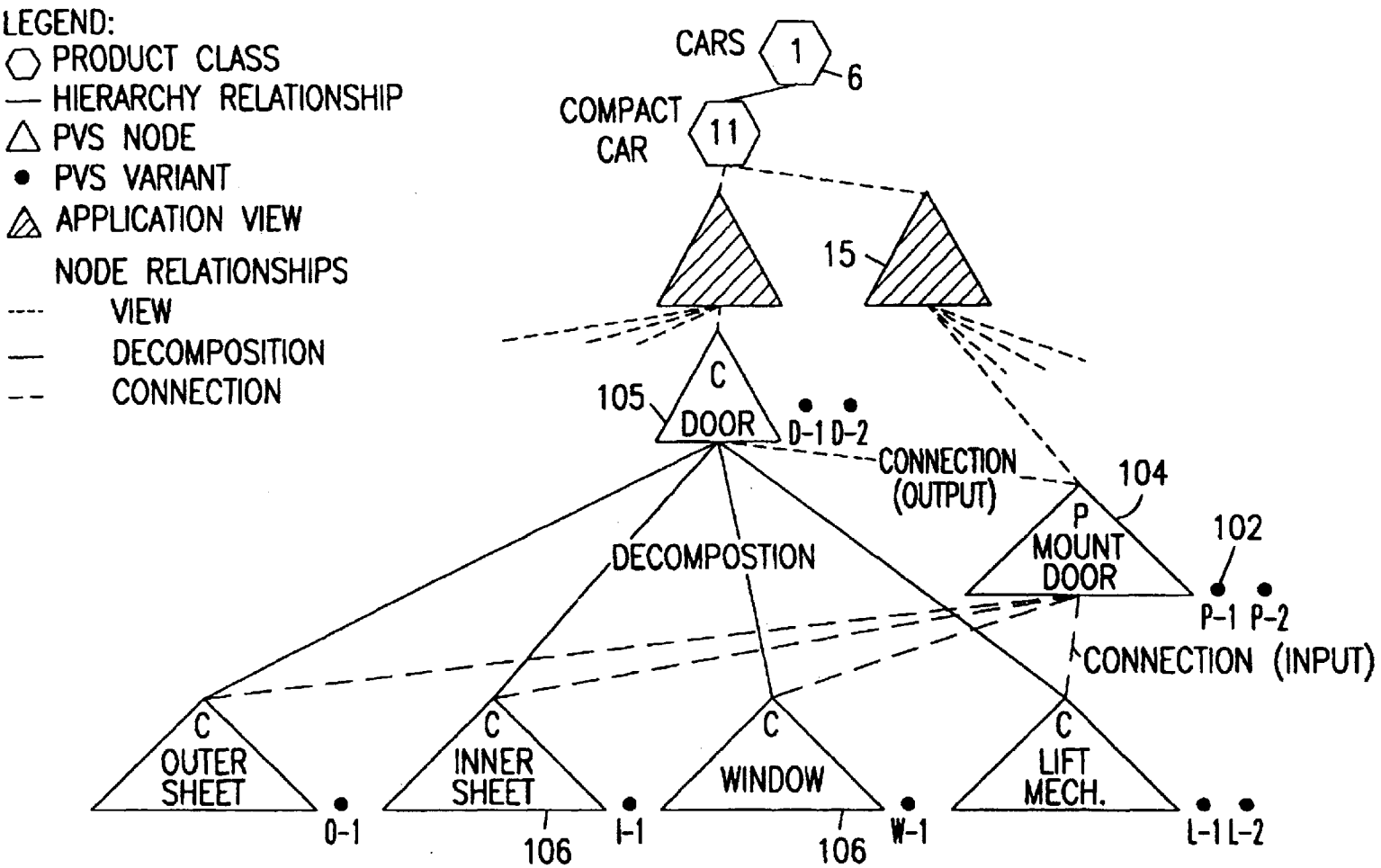
FIG. 4 shows an example for the application view "Production and Process Planning (Routing)" associated with the process "mount door" in the data structure.

The next layer, the Application View Layer 3, enables the viewing of a particular product class in various ways, depending on departmental requirements. Engineering, for example, may need to sec all top-level component nodes associated with a generic product class. FIG. 2 shows the application view "Engineering" 13, which is a collection of all top-level component nodes 101 that are associated with "Transportation Vehicle" or any of its subclasses "bicycle" "mountain bike" or "racing bike". Similarly, materials requirement planning may require a view of all component nodes used in the production of a more specific product class. FIG. 3 shows the application view "Production" 14, which depicts all component nodes 101 used in the production of the more specific product class "mountain bike". Production planning, by contrast, may need to view the routing of a particular product through its production steps, and so would need to see all process nodes associated with a particular product class, and all component nodes associated with those process nodes. FIG. 4 shows the application view "Production and Process-Planning (Routing)" 15, which depicts the integration of product decomposition and process operations. Specifically, the process node "mount door" 104 is connected to component node "door" 105 and the nodes 106 representing its sub-components.

Figure 5:
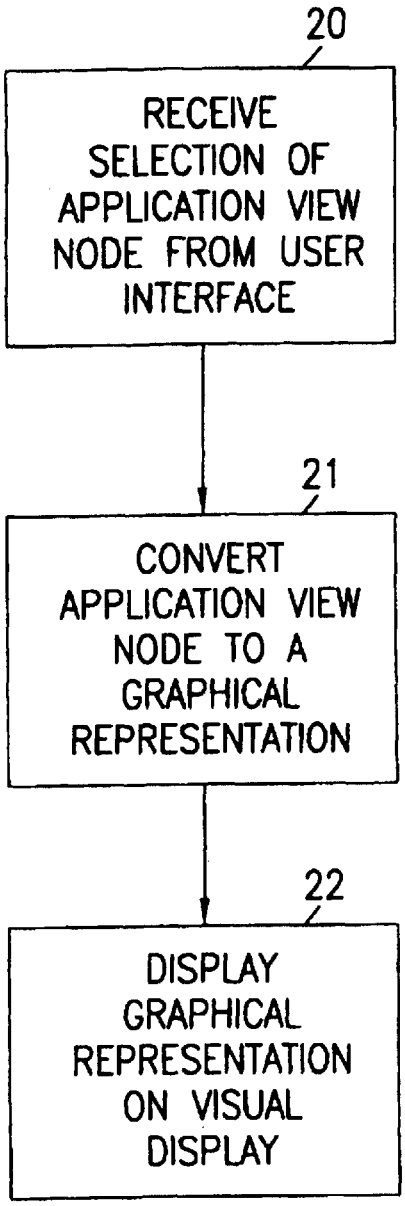
FIG. 5 is a flowchart of the method of displaying a graphical representation of an application view node.

The Application View Layer 2 preferably stores different views for departments across the company. Upon specification through the user interface of the desired application view node, the central processor of the computer based system converts the application view into a graphical representation for visual display on the display of the computer based system. FIG. 5 is a flowchart showing the sequence of receiving the application view node from the user interface 20, converting the application view node to a graphical representation 21 and displaying the graphical representation on a visual display 22. The user interface, central processor and display of SAP's R/3 system, among others, are suitable for receiving the input of the desired application view node, converting it into a graphical representation for visual display, and displaying the graphical representation.

The Node Structure Layer 4 represents the functional decomposition of the product into components and processes. The primary elements of the Node Structure Layer 4 are nodes 101, which include component nodes and process nodes. Component nodes are abstractions of the concrete items that are used in the product. For example, a car may have a separate component node for "engine", but not for a particular type of engine. Instead, the actual items that are used to produce the product are specified by component variants associated with the component nodes. Component variants are discussed in greater detail below in the context of the Variant Layer 5. Process nodes are linked to component nodes and are abstractions of the actual steps used to manipulate the component in the production process. For example, the component "door" may have a separate process node for "mount door", but not for mounting a particular type of door, which may require different production steps. Instead, the actual production steps that are used to manipulate the component in the production process are specified by process variants associated with process nodes. Process variants are discussed in greater detail below in the context of the Variant Layer. The Node Structure Layer 4 consists of all component nodes and process nodes for a particular product class. It has a multi-layer structure to portray components, their subordinate components, and related processes.

Figure 6:
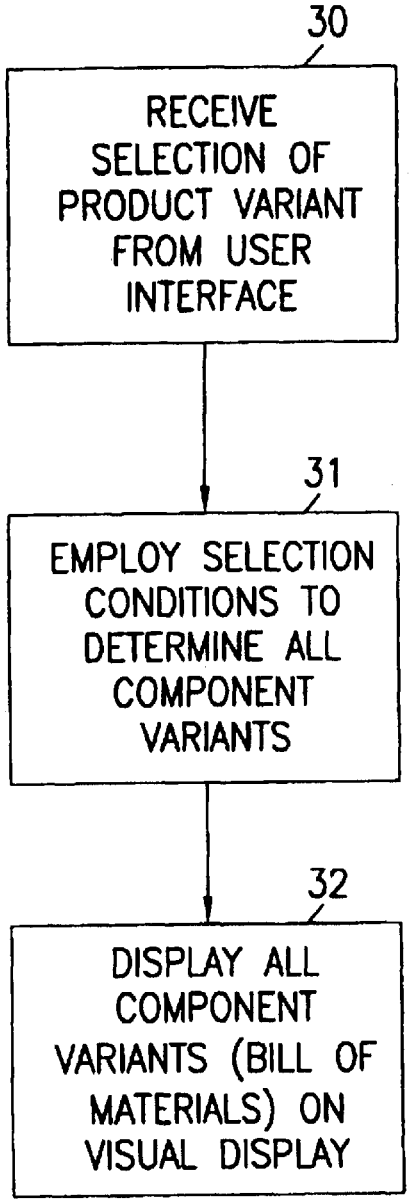
FIG. 6 is a flowchart of the method of displaying the bill of materials for a particular product variant.

The lowest-level layer of the Product Variant Structure 1 is the Variant Layer 5, which consists of variants 102 that are related to nodes 101, including component variants that are related to component nodes, and process variants that are related to process nodes. Component variants are concrete items that are used as part of the final product. When a particular product is built, the component node is replaced by one of its related component variants. Since more than one component variant may be related to a component node, there is a selection condition associated with each component node that specifies the product characteristic for which each component variant is used. Accordingly, given a particular product with specific characteristics, or a product variant, the variant layer can supply its bill of materials. The bill of materials for a particular product variant can be obtained by specifying the desired product variant through the user interface of the computer-based system, whereupon the central processor will apply the selection conditions to determine the bill of materials for the specified product variant, and display the specific component variants that are used in the product variant. FIG. 6 shows the steps of receiving the selection of a product variant from the user interface 30, employing the selection conditions associated with the component nodes 31, and displaying the bill of materials on a visual display 32. The central processor can also display the specific process variants, or all of the actual production steps that are used in making the specified product variant, on a visual display. SAP's R/3 system, among others, provides a suitable user interface, central processor, and visual display.

Process variants represent concrete operations used in the production process for concrete component variants. Process variants are related to process nodes and are selected by a selection condition based upon the desired product variant (and hence the particular component variant). Accordingly, given a particular product with specific component variants, the variant layer can supply its concrete routing through actual production steps.

Figure 7:
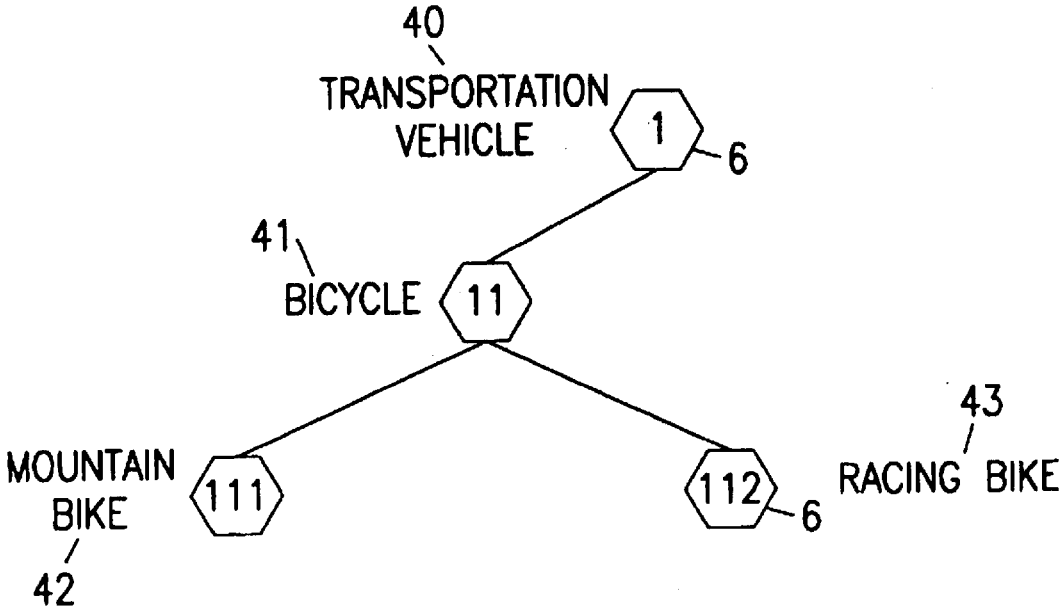
FIG. 7 shows the decomposition of a product class into narrower product classes in the data structure.

Component variants are selected and final products are produced by specifying characteristics of a particular product class. As shown in FIG. 7, product classes 6 may be represented hierarchically, and consist of "producible" and "non-producible" categories. For example, "transportation vehicle" 40 and "bicycle" 41 are nonproducible product classes used for structuring only, while "mountain bike" 42 and "racing bike" 43 are producible product classes. Both the producible and non-producible classes and their associated nodes and variants can be viewed in the application view layer 3.

Figure 8:
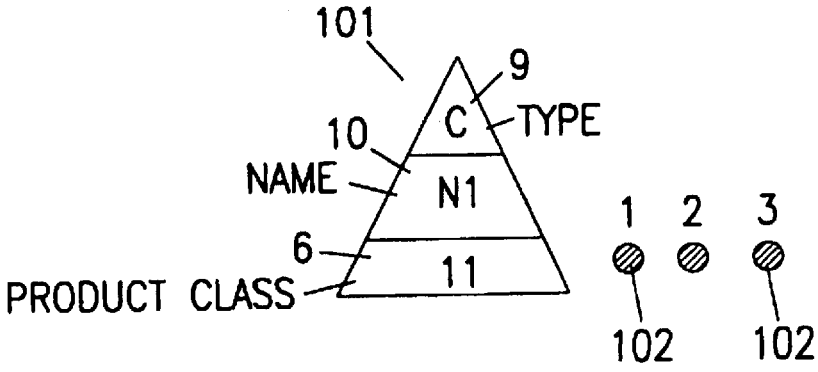
FIG. 8 shows component variants of a component node related to a product class in the data structure.

Component nodes and process nodes are the primary elements of the product variant structure 1 of the computer based system. The component node 101 "Engine" in a car, may have the concrete item "2.4 1 6 cyl." as one of its associated component variants. As shown in FIG. 8, a node 101 is depicted as a triangle with a letter designating its type 9 ("C" for component node and "P" for process node, for example). A symbol 10 represents the name of the component or process, a number describes its related product class 6, and bullet points for the variants 102 associated with that node 101. Since component nodes maybe related to more than one product class 6, a variant differentiation function distinguishes attributes of component variants, such as quantity of a specific component variant or the selection condition, according to the product class 6.

Nodes 101 are related to each other in three ways. In a car, for example, the component node "wheel" is connected to component nodes "rim" and "tire". This is called a "decomposition type" node relationship. A process node may also be decomposed into several process nodes, so the decomposition type node relationship may be of the type "CC" or "P-P". The "connection relationship" establishes the production process flow between component nodes and process nodes. Since processes may also connect to each other without an intervening component, the connection relationship can be of the type "C-P", "P-C" and "P-P".

Figure 9:
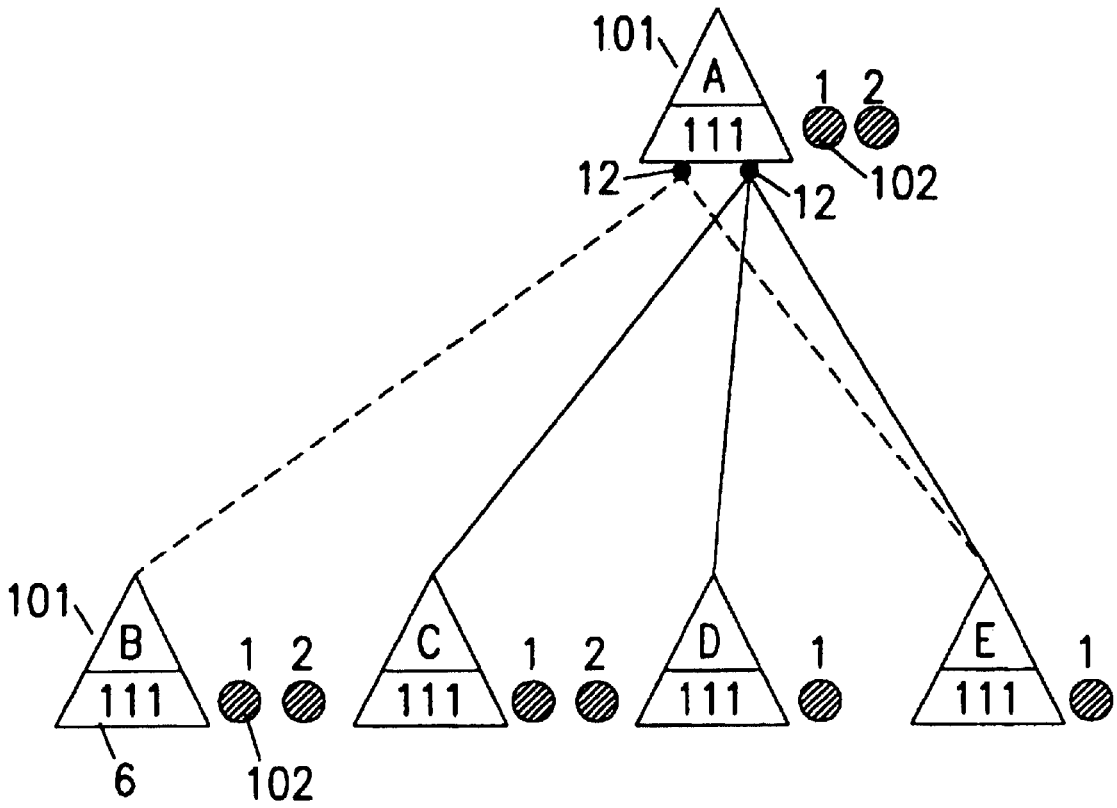
FIG. 9 shows an example of the alternative decomposition of a component in the data structure.

As shown in FIGS. 2 and 3, nodes 101 are also connected to an application view, which establishes the connection between the Product Layer and the Node Structure Layer 4 of the Product Variant Structure 1. This is known as a view-type node relationship. FIG. 9 shows how a component node 101 in the node structure layer may have more than one decomposition into subordinate components. The choice among decompositions may depend upon various criteria, including the plant where the product is manufactured. Different node segments 12 are provided for each alternative decomposition of a component into subordinate components.

Figure 10:
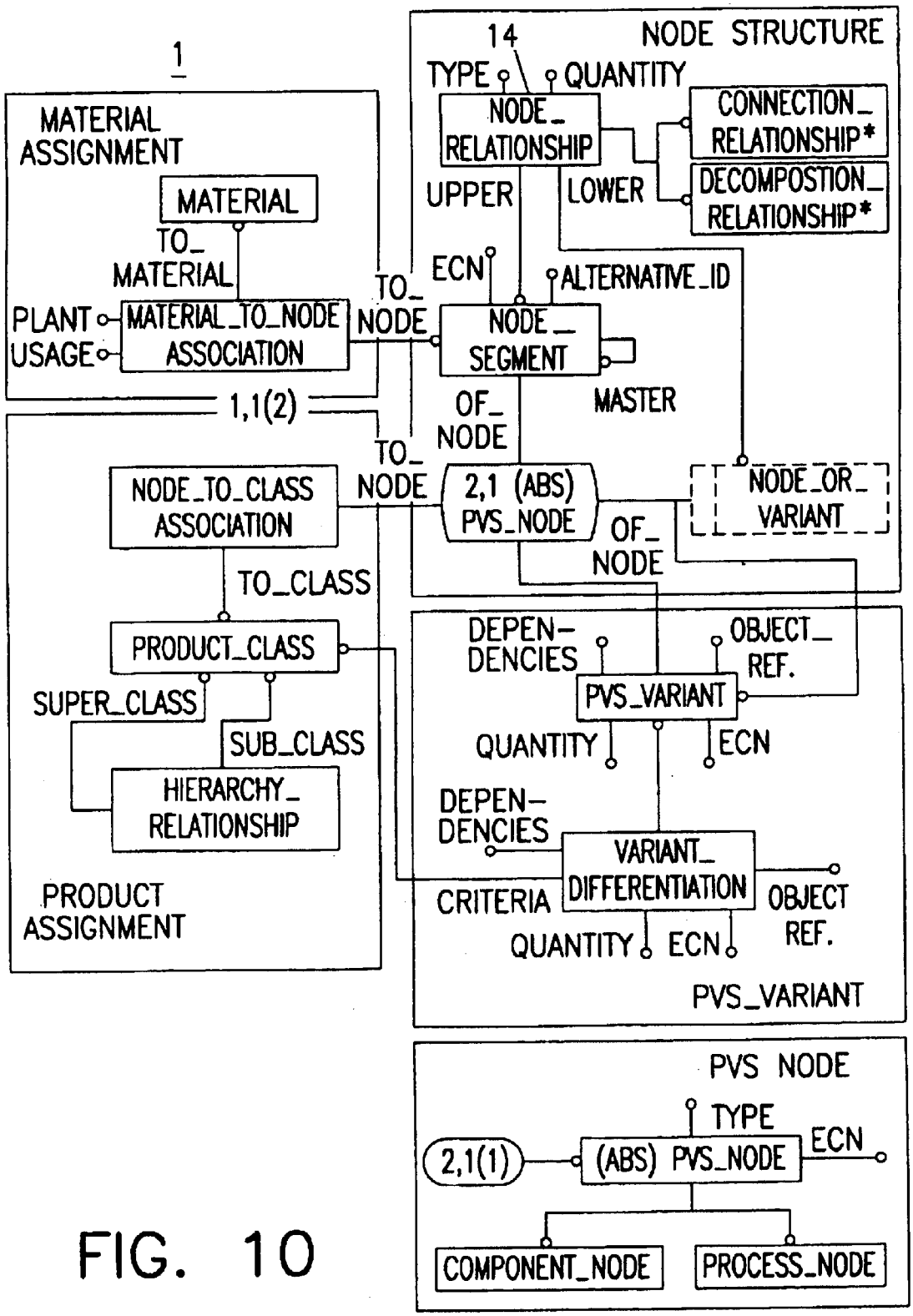
FIG. 10 shows a summary of the elements of the Product Variant Data Structure in a data model according to EXPRESS-G (ISO 10303-11).

FIG. 10 shows a summary of the Product Variant Structure 1 in a data model 14 with entities according to EXPRESS-G (ISO 10303-11).

While there have been shown and described and pointed out fundamental novel features of the invention as applied to embodiments thereof, it will be understood that various omissions and substitutions and changes in the form and details of the invention, as herein disclosed, may be made by those skilled in the art without departing from the spirit of the invention. It is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A computer based system for displaying components and processes associated with configurable product classes, comprising a display, a memory, a central processor and a user interface, wherein said memory has a data structure, said data structure comprises:

a) a product layer comprising at least one product, wherein each product is represented by a product class;

b) a node structure layer comprising at least one component node, wherein each of said at least one component node represents a component, and wherein said each of said at least one component node is linked to the product class representing the respective one of said at least one product in which said component is used, and at least one process node, wherein each of said at least one process node represents a process, and wherein said each of said at least one process node is linked to the product class representing the respective one of said at least one product in whose manufacture said process is used, and wherein said each of said at least one process node is also linked to the respective one of said at least one component node representing a component used in said process represented by said each of said at least one process node;

c) a variant layer comprising at least one component variant, wherein each of said at least one component variant is associated with one of said at least one component node, and wherein said each of said at least one component variant represents a concrete item that is used in a specific product variant of the respective one of said at least one product represented by the product class to which said one of said at least one component node associated with said each of said at least one component variant is linked;

at least one process variant, wherein each of said at least one process variant is associated with one of said at least one process node, and wherein said each of said at least one process variant represents actual production steps used in the manufacture of a specific product variant of the respective one of said at least one product represented by the product class to which said one of said at least one process node associated with said each of said at least one process variant is linked;

d) an application view layer comprising at least one application view node, wherein each of said at least one application view node is linked to a product class, and wherein said each of said at least one application view node comprises at least one of a collection of all component nodes that are linked to the product class to which the respective one of said each of said at least one application view node is linked, and a collection of all process nodes that are linked to said product class to which the respective one of said each of said at least one application view node is linked; and wherein said user interface is used to receive a selection of one of said at least one application view node, and wherein said central processor converts said selected application view node into a graphical representation for visual display on said display.

2. The computer based system of claim 1, wherein each of said at least one component variant is associated with a selection condition that indicates which of said at least one component variant is used in said specific product variant according to specific product characteristics of said specific product variant.

3. The computer based system of claim 2, wherein said user interface is used to receive a selection of said specific product variant, and wherein said central processor employs said selection condition for each of said at least one component node linked to the product class of said specific product variant to determine all component variants associated with said selected product variant in said data structure, which is the bill of materials for said specific product variant, and wherein said central processor displays said bill of materials for said specific product variant on said display.

4. The computer based system of claim 1, wherein said at least one product is a plurality of products, and wherein said plurality of products are arranged based on the hierarchical relationship between product classes.

5. The computer based system of claim 1, wherein said at least one component node is a plurality of component nodes, and wherein said plurality of component nodes are arranged based on the hierarchical relationship between components.

6. The computer based system of claim 5, wherein said hierarchical relationship between components depicts the decomposition of components into sub-components.

7. The computer based system of claim 6, wherein there are a plurality of decompositions of a particular component into sub-components.

8. The computer based system of claim 7, wherein selection of one of said plurality of decompositions for a particular component into sub-components is based on the plant where the product associated with said particular component is manufactured.

9. A method of graphically displaying components and processes associated with configurable products stored in a data structure, the data structure comprising:

a) a product layer comprising at least one product, wherein each product is represented by a product class;

b) a node structure layer comprising at least one component node, wherein each of said at least one component node represents a component, and wherein said each of said at least one component node is linked to the product class representing the respective one of said at least one product in which said component is used, and at least one process node, wherein each of said at least one process node represents a process, and wherein said each of said at least one process node is linked to the product class representing the respective one of said at least one product in whose manufacture said process is used, and wherein said each of said at least one process node is also linked to the respective one of said at least one component node representing a component used in said process represented by said each of said at least one process node;

c) a variant layer comprising at least one component variant, wherein each of said at least one component variant is associated with one of said at least one component node, and wherein said each of said at least one component variant represents a concrete item that is used in a specific product variant of the respective one of said at least one product represented by the product class to which said one of said at least one component node associated with said each of said at least one component variant is linked;

at least one process variant, wherein each of said at least one process variant is associated with one of said at least one process node, and wherein said each of said at least one process variant represents actual production steps used in the manufacture of a specific product variant of the respective one of said at least one product represented by the product class to which said one of said at least one process node associated with said each of said at least one process variant is linked;

d) an application view layer comprising at least one application view node, wherein each of said at least one application view node is linked to a product class, and wherein said each of said at least one application view node comprises at least one of a collection of all component nodes that are linked to the product class to which the respective one of said each of said at least one application view node is linked, and a collection of all process nodes that are linked to said product class to which the respective one of said each of said at least one application view node is linked;

the method comprising the steps of i) receiving a selection of one of said at least one application view node from a user interface;

ii) converting said one of said at least one application view node into a graphical representation for visual display; and iii) displaying said graphical representation on a display.

10. The method of claim 9, wherein each of said at least one component variant is associated with a selection condition that indicates which of said at least one component variant is used in said specific product variant according to specific product characteristics of said specific product variant.

11. The method of claim 10, wherein said user interface is used to receive a selection of said specific product variant, and wherein said central processor employs said selection condition for each of said at least one component node linked to the product class of said specific product variant to determine all component variants associated with said selected product variant in said data structure, which is the bill of materials for said specific product variant, and wherein said central processor displays said bill of materials for said specific product variant on said display.

12. The method of claim 9, wherein said at least one product is a plurality of products, and wherein said plurality of products are arranged based on the hierarchical relationship between product classes.

13. The method of claim 9, wherein said at least one component node is a plurality of component nodes, and wherein said plurality of component nodes are arranged based on the hierarchical relationship between components.

14. The method of claim 13, wherein said hierarchical relationship between components depicts the decomposition of components into sub-components.

15. The method of claim 14, wherein there are a plurality of decompositions of a particular component into subcomponents.

16. The method of claim 15, wherein selection of one of said plurality of decompositions for a particular component into sub-components is based on the plant where the product associated with said particular component is manufactured.

17. A computer based system for displaying components and processes associated with hierarchical product classes, comprising a display, a memory, a central processor and a user interface, wherein said memory has a data structure, said data structure comprises:

a) a product layer comprising at least one product, wherein each product is represented by a product class;

b) a node structure layer comprising at least one component node, wherein each of said at least one component node represents a component, and wherein said each of said at least one component node is linked to the product class representing the respective one of said at least one product in which said component is used, and at least one process node, wherein each of said at least one process node represents a process, and wherein said each of said at least one process node is linked to the product class representing the respective one of said at least one product in whose manufacture said process is used, and wherein said each of said at least one process node is also linked to the respective one of said at least one component node representing a component used in said process represented by said each of said at least one process node;

c) a variant layer comprising at least one component variant, wherein each of said at least one component variant is associated with one of said at least one component node, and wherein said each of said at least one component variant represents a concrete item that is used in a specific product variant of the respective one of said at least one product represented by the product class to which said one of said at least one component node associated with said each of said at least one component variant is linked;

at least one process variant, wherein each of said at least one process variant is associated with one of said at least one process node, and wherein said each of said at least one process variant represents actual production steps used in the manufacture of a specific product variant of the respective one of said at least one product represented by the product class to which said one of said at least one process node associated with said each of said at least one process variant is linked;

d) an application view layer comprising at least one application view node, wherein each of said at least one application view node is linked to a product class, and wherein said each of said at least one application view node comprises at least one of a collection of all component nodes that are linked to the product class to which the respective one of said each of said at least one application view node is linked, and a collection of all process nodes that are linked to said product class to which the respective one of said each of said at least one application view node is linked;

the computer based system further comprising i) means for receiving a selection of one of said at least one application view node from a user interface;

ii) means for converting said selected application view node into a graphical representation for visual display; and iii) means for displaying said graphical representation on a display.

18. The computer based system of claim 17, wherein each of said at least one component variant is associated with a selection condition that indicates which of said at least one component variant is used in said specific product variant according to specific product characteristics of said specific product variant.

19. The computer based system of claim 18, wherein said user interface is used to receive a selection of said specific product variant, and wherein said central processor employs said selection condition for each of said at least one component node linked to the product class of said specific product variant to determine all component variants associated with said selected product variant in said data structure, which is the bill of materials for said specific product variant, and wherein said central processor displays said bill of materials for said specific product variant on said display.

20. The computer based system of claim 17, wherein said at least one product is a plurality of products, and wherein said plurality of products are arranged based on the hierarchical relationship between product classes.

21. The computer based system of claim 17, wherein said at least one component node is a plurality of component nodes, and wherein said plurality of component nodes are arranged based on the hierarchical relationship between components.

22. The computer based system of claim 21, wherein said hierarchical relationship between components depicts the decomposition of components into sub-components.

23. The computer based system of claim 22, wherein there are a plurality of decompositions of a particular component into sub-components.

24. The computer based system of claim 23, wherein selection of one of said plurality of decompositions for a particular component into sub-components is based on the plant where the product associated with said particular component is manufactured.

25. A computer based system for displaying components and processes associated with configurable product classes, comprising a display, a memory, a central processor and a user interface, wherein said memory has a data structure, said data structure comprises:

a) a product layer comprising a product represented by a product class;

b) a node structure layer comprising a component node, wherein said component node represents a component, and wherein said component node is linked to said product class, and a process node, wherein said process node represents a process, and wherein said process node is linked to said product class, and wherein said process node is also linked to said component node;

c) a variant layer comprising a component variant, wherein said component variant is associated with said component node, and wherein said component variant represents a concrete item that is used in a specific product variant of said product represented by said product class;

a process variant, wherein said process variant is associated with said process node, and wherein said process variant represents actual production steps that are used in the manufacture of a specific product variant of said product represented by said product class;

d) an application view layer comprising an application view node, wherein said application view node is linked to said product class, and wherein said application view node comprises at least one of said component node and said process node;

wherein said user interface is used to receive a selection of said application view node, and wherein said central processor converts said selected application view node into a graphical representation for visual display on said display.

*26. A computer-based system comprising a display, a memory, a central processor, and a user interface, wherein said memory has a data structure, said data structure comprising:*

*a product class;*

*a component node, wherein said component node is linked to said product class, and*

*a process node, wherein said process node represents a process, is linked to said product class, and is also linked to said component node;*

*a component variant associated with said component node, and wherein said component variant represents an item that is used in a product variant of a product represented by said product class;*

*a process variant associated with said process node, wherein said process variant represents actual production steps that are used in the manufacture of a product variant of said product represented by said product class; and*

*an application view node linked to said product class,*

*said user interface being configured to receive a selection of said application view node, and said central processor being configured to convert said selected application view node into a graphical representation for visual display on said display.*

* * * * *